March 14, 1967 J. C. H. DAVIS 3,309,693

ELECTRICAL SIGNALLING SYSTEMS

Filed May 14, 1963 2 Sheets-Sheet 1

INVENTOR
JOHN CHRISTOPHER
HAMMOND DAVIS
BY
DEZSOE STEINHERZ
ATTORNEY

INVENTOR
JOHN CHRISTOPHER
HAMMOND DAVIS
BY
DEZSOE STEINHERZ
ATTORNEY

United States Patent Office 3,309,693

Patented Mar. 14, 1967

3,309,693

ELECTRICAL SIGNALLING SYSTEMS

John Christopher Hammond Davis, Taplow, England, assignor to British Telecommunications Research Limited, Taplow, England, a British company Filed May 14, 1963, Ser. No. 280,206
Claims priority, application Great Britain, May 16, 1962, 18,900/62
8 Claims. (Cl. 340—347)

The present invention relates to electrical signalling systems and is more particularly concerned with systems of the type generally known as pulse code modulation systems which usually operate on a time division multiplex basis.

In such systems, signal waveforms are transmitted by taking samples of the waveform at suitable intervals and converting the information derived from the sample into a numerical value which may then be conveniently transmitted in binary form. The conversion, which need not be and preferably is not linear, is effected by an encoder and a decoder at the receiving end serves for the reverse operation. The present invention is concerned with pulse code modulation communication systems which make use of the capacitive storage principle. The chief object of the present invention is to provide pulse code modulation communication systems which are simpler and more economical than those heretofore suggested in that they employ capacitors for storage instead of toggles and involve much simpler circuitry.

According to one feature of the invention in a storage arrangement for a continuous series of signal elements each having one or other of two values and forming a group all the elements of which are effective simultaneously, storage is effected on a plurality of capacitors the state of charge of which is dependent on the potential applied to the base of a transistor, which is associated with a plurality of further transistors to form a multi-outlet current switch, the further transistors being rendered effective in turn under the control of time pulses corresponding to the different signal elements.

According to another feature of the invention an encoding device comprises a comparator, a plurality of storage devices which are associated with the comparator in turn under the control of time pulses corresponding to different digits and a plurality of analogue switches respectively associated with the storage devices and arranged to connect up successively resistors of binarily related values to produce operation of the comparator in accordance with the value of the signal being encoded, the storage devices comprising capacitors, the state of charge of which is adjusted dependent on the operation of the comparator.

Figures 1, 2:
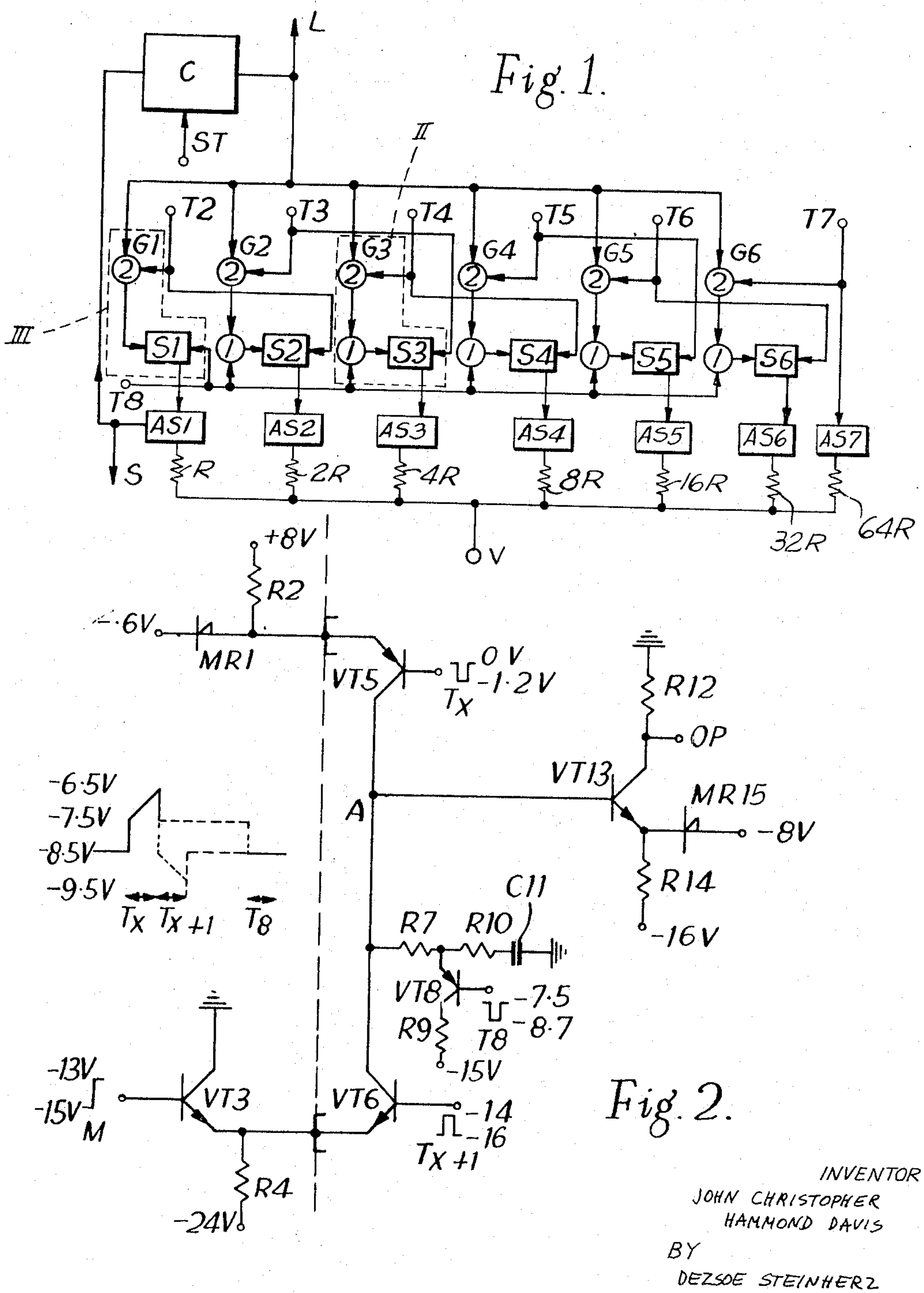
Figure 3:
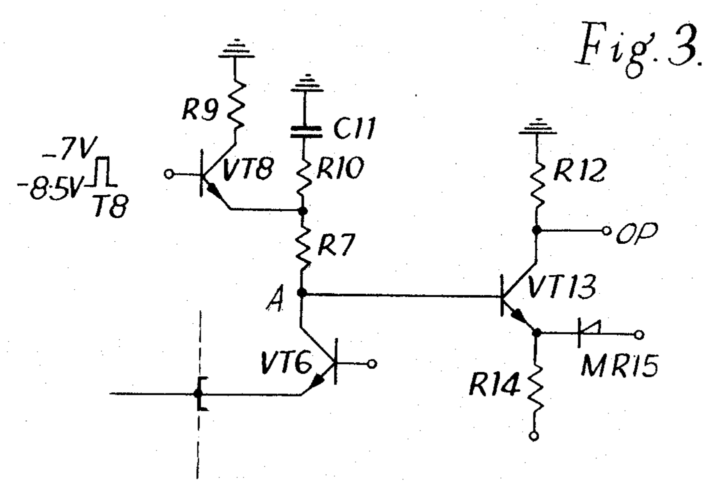
Figure 4:
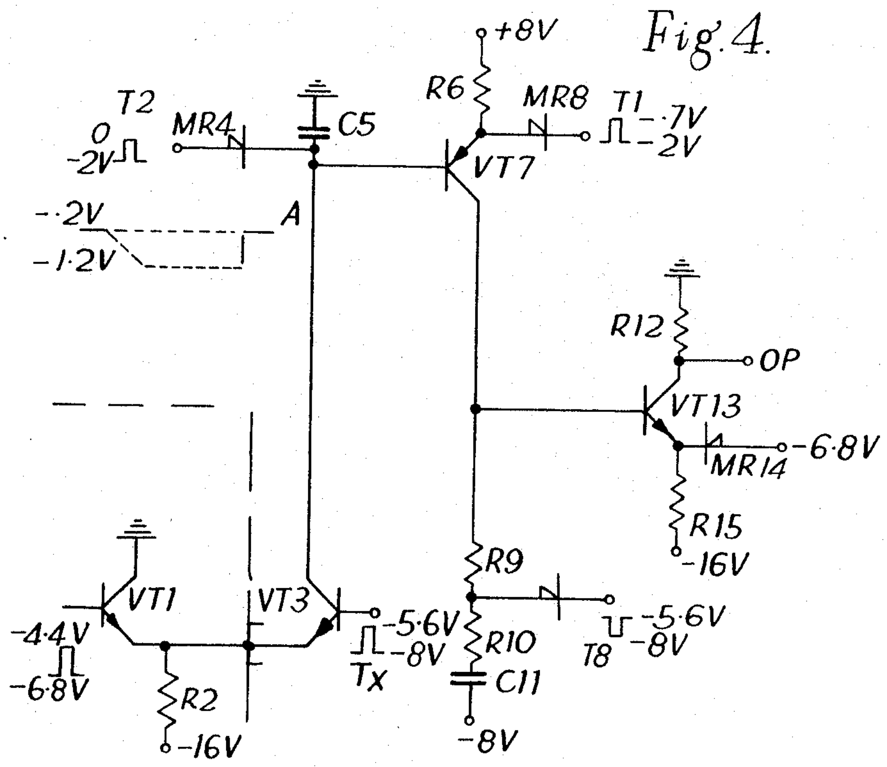

The invention will be better understood from the following description of its application to a feedback encoder or decoder. FIGURE 1 is a block diagram of the improved form of encoder for operation on a 7-digit basis, FIGURE 2 shows the detailed circuits for one stage and the common equipment with which all the stages co-operate, FIGURE 3 shows the modifications required to the first stage due to the fact that it is set rather than reset by the initial time pulse, while FIGURE 4 shows a generally similar circuit diagram of a corresponding decoder.

FIGURE 1 is assumed to make use of capacitive stores S1–S6 of which six are provided since a store is not necessary for the seventh digit as no further resolution is required at that stage. The stores are drawn as rectangles which are assumed to be set by an input from the right and reset by an input from the left, while the set output is shown as derived from the lower side of the rectangle. These stores by means of their set outputs control the various analogue switches AS1–AS6 whereby binarily related resistors R, 2R, 4 . . . 32R are introduced or cut out as required in order to produce a current from the source to balance the signal applied over lead S and thus determine the successive operations of the comparator C. These capacitive stores replace toggles in known arrangements and for such toggles it is usual to employ a strobe signal. With the arrangement proposed according to the invention, the strobe signal is applied to the comparator by way of lead ST. This allows the comparator output to be used as the digital output signal which is sent to line over lead L and ensures that the line signal has the same code combination as that determined by the encoder feedback loop. Previous arrangements have not used a strobed comparator and it has been necessary to derive the line output from the individual stores to prevent mistakes due to marginal decisions.

The encoding operation is controlled by timing pulses T1–T8 which serve to activate the various stores and generate the corresponding digits in turn. These pulses are equal, regularly recurring consecutive pulses and for the circuits of FIGURE 1 pulse T1 is not employed. Pulse T8 effects setting of the first store S1 and resetting of the remaining stores. During timing pulse T2, store S1 is reset over the gate G1 if an output is obtained from the comparator. T2 also sets the store S2. During T3, store S2 is reset over gate G2 if an output is obtained from the comparator and store S3 is set. Similar arrangements apply to the remaining stores under the control of timing pulses T4–T7 and gates G3–G6. In accordance with the set or reset conditions of the stores, the current to balance the signal is adjusted in progressively smaller binary steps. The least significant analogue switch AS7 associated with resistor 64R is controlled only by timing pulse T7 and does not have an associated store as this would serve no useful purpose since the resulting comparator operation defines the final digit.

Referring now to the detailed circuit diagram of FIGURE 2, which corresponds to the dotted enclosure marked II in FIGURE 1 it should be explained that the equipment to the left of the dotted line is common to the various stages while that on the right represents a single stage, the other stages except the first being similar. Rectifier MR1 and transistor VT5 form part of a multi-outlet current switch, similar transistors being provided for the other stages. During the timing pulse TX, corresponding to the stage X concerned, which lasts for substantially one bit period, the base of VT5 is driven more negative and current flows through this transistor to charge the capacitor C11 by way of resistors R7 and R10. This results in a waveform at the point A having a ramp or slope superimposed on a square pulse due to the drop in R7 and R10; this is indicated in the waveform diagram on the left of FIGURE 2. This potential is applied to the base of transistor VT13 which in association with resistor R14 and rectifier MR15 forms a current switch. An amplified output is taken from terminal OP connected to the collector VT13 and serves to operate the corresponding analogue switch.

Transistors VT3 and VT6 form part of another multi-outlet current switch and during the timing pulse $T(X+1)$, which is applied to the base of VT6, this transistor will conduct but only if the input M at the base of VT3 has the more negative value. If VT6 conducts, capacitor C11 is discharged in a manner similar to its previous charging as indicated dotted in the diagram and the analogue switch is opened again. However if M has the less negative value, VT3 conducts and VT6 remains cut off and consequently capacitor C11 remains charged and the analogue switch remains in the closed position. If the circuit is being employed in a feedback encoder as has been assumed, M will represent the output of the comparator and a setting conditional on its state has been achieved.

At the end of the coding cycle, it is important that all capacitors in the various stages should be discharged to a standard voltage whether or not they have previously been discharged during the cycle. This is taken care of by means of transistor VT8 and resistor R10 in the stage shown and corresponding elements in the other stages The negative-going waveform T8 is connected to the base of transistor VT8 and consequently while this timing pulse is operative, the transistor conducts and discharges the capacitor through resistor R9.

Though constant current charge and discharge of capacitor C11 is preferred since it is faster for a given maximum current and more easily controlled, some form of voltage limiting is required during the cycle to prevent a steady drift at point A. Thus for the circuits suggested, it is essential to ensure that the charge introduced by VT5 is larger than that extracted by VT6 otherwise transistor VT8 will become permanently back-biased. One method of preventing this is to connect a diode between the capacitor and a clamping voltage but other arrangements are readily possible.

FIGURE 3 shows the alterations which are necessary to the first stage to take care of the fact that the timing pulse T8 effects setting rather than resetting of the store concerned. In FIGURE 3 therefore the initial current switch comprising transistor VT5 is not provided for charging of the capacitor but this is done by way of transistor VT8 which is of complementary type compared with that shown in FIGURE 2. The control of the significant discharging operation is effected by the waveform M over a transistor VT6 in the manner shown for transistors VT3 and VT6 in FIGURE 2. The circuits of FIGURE 3 it will be appreciated correspond to the dotted enclosure marked III in FIGURE 1.

In the decoder the digits arrive from line in serial form and after regeneration are required in parallel form so that all the analogue switches can be switched on and off together. FIGURE 4 shows a suitable capacitor storage logic stage for achieving this, together with part of the common equipment as indicated within the dotted enclosure.

Transistors VT1 and VT3 form part of a multi-outlet current switch, transistors corresponding to VT3 for other stages being connected in parallel therewith. During the timing pulse TX corresponding to the stage concerned, if the base of transistor VT1 has the less negative value dependent on the incoming line digit, it will conduct and transistor VT3 will remain cut off. If however, the line digit has such a value that the base of VT1 has the more negative value, VT1 will be cut off and current will flow through VT3 to charge the capacitor C5. Since the output represented by the potential of the point A is not required to be read at this stage, there is no need for a fast rise in the potential of C5 and therefore no resistor need be used in this circuit. The changes in the potential of capacitor C5 are indicated in the diagram on the left of FIGURE 4. During the timing pulse T1, a current switch formed by resistor R6, transistor VT7 and rectifier MR8 becomes effective so that if A is at its most negative potential, transistor VT7 conducts and thus capacitor C11 is charged through resistors R9 and R10. This transfer occurs simultaneously in all stages so that the analogue switches are operated from terminal OP by way of suitable amplifiers such as the current switch shown formed of transistor VT13, rectifier MR14 and resistor R15. During the timing pulse T2, that is to say immediately after transfer has taken place, capacitor C5 is discharged via rectifier MR4 as controlled by timing pulse T2. It is accordingly then ready to receive the corresponding digit of the next signal from line which obviously cannot be earlier than T3. During timing pulse T8, capacitor C11 is discharged by way of rectifier MR16 and resistor R10 as controlled by the application of the time pulse thereto, and it is then ready to store the corresponding digit in the next coded number. If a shorter read-out time is required, capacitor C11 can be discharged at an earlier stage.

Though the detailed description of the FIGURE 4 arrangement has been of the application of the invention to a p.c.m. decoder, a similar arrangement could be used wherever series to parallel conversion is needed but unlimited holding times are not required.

It will be understood that the voltage figures shown on the drawings are only given by way of example.

The invention accordingly applies the principle of capacitive storage to the solution of a particular problem for which its use results in appreciable advantages in the way of simplicity and saving of components.

I claim:

1. For use in a pulse code modulation communication system, a storage arrangement for a signal character involving a predetermined number of successive signal elements each having one or other of two values, comprising in combination, a plurality of capacitors equal in number to the number of signal elements forming a character, a like plurality of transistors respectively associated with said capacitors, a pulse source providing a series of regularly recurring timing pulses, a further transistor, means controlled by said timing pulses for effectively associating said further transistor with each of said plurality of transistors in turn to form a multi-outlet current switch, control means for said further transistor dependent on the values of said signal elements, and means controlled respectively by said plurality of transistors for altering the state of charge of any one of said associated capacitors if said further transistor is non-conducting due to the corresponding signal element having a particular one of said two values when said further transistor is associated with the corresponding one of said plurality of transistors.

2. For use in a pulse code modulation communication system, a storage arrangement for a signal character involving a predetermined number of successive signal elements each having one or other of two values, comprising in combination, a plurality of capacitors equal in number to the number of signal elements forming a character, a like plurality of transistors respectively associated with said capacitors, a pulse source providing a series of regularly recurring timing pulses, a further transistor, means controlled by said timing pulses for effectively associating said further transistor with each of said plurality of transistors in turn to form a multi-outlet current switch, control means for said further transistor dependent on the values of said signal elements, means controlled by said timing pulses for bringing each of said capacitors to a standard state of charge immediately before its associated transistor is associated with said further transistor, and means controlled respectively by said plurality of transistors for altering the state of charge of any one of said associated capacitors if said further transistor is non-conducting due to the corresponding signal element having a particular one of said two values when said further transistor is associated with the corresponding one of said plurality of transistors.

3. For use in a pulse code modulation communication system, a storage arrangement for a signal character involving a predetermined number of successive signal elements each having one or other of two values, comprising in combination, a plurality of capacitors equal in number to the number of signal elements forming a character, a like plurality of transistors respectively associated with said capacitors, a pulse source providing a series of regularly recurring timing pulses, a further transistor, means controlled by said timing pulses for effectively associating said further transistor with each of said plurality of transistors in turn to form a multi-outlet current switch, control means for said further transistor dependent on the values of said signal elements, means controlled by one of said timing pulses for simultaneously bringing all said capacitors to a standard state of charge, and means controlled respectively by said plurality of transistors for altering the state of charge of any one of said associated capacitors if said further transistor is non-conducting due to the corresponding signal element having a particular one of said two values when said further transistor is associated with the corresponding one of said plurality of transistors.

4. A storage arrangement as claimed in claim 1 comprising a plurality of analogue switches and a plurality of switching transistors each respectively associated with said plurality of capacitors, means for altering the potential on the base of each switching transistor in accordance with the state of charge of its associated capacitor and means for operating said analogue switches in the collector circuits of their associated switching transistors.

5. For use in a pulse code modulation comunication system, an encoding device for converting an analogue signal into a character involving a predetermined number of successive signal elements each having one or other of two values and comprising in combination a comparator, a plurality of capacitors, a pulse source providing a series of regularly recurring timing pulses, means for altering the state of charge of said capacitors in turn under the joint control of said timing pulses and the output from said comparator, a like plurality of analogue switches, means for controlling said analogue switches in accordance with the state of charge of said capacitors, a plurality of binarily related resistors respectively connected up by said analogue switches, a source of current applied to said resistors, means for comparing the resultant current through said resistors with said analogue signal and operating said comparator differently according as one is greater or less than the other, and means for transmitting a signal character in accordance with successive outputs from said comparator.

6. An encoding device as claimed in claim 5 comprising a plurality of transistors respectively associated with said capacitors, a further transistor associated with said comparator, the emitters of all said transistors being connected together, means for altering the potential of the base of said further transistor dependent on the output of said comparator, means for altering the potentials of the bases of said plurality of transistors respectively under the control of said timing pulses, and connections from the collectors of said plurality of transistors to their associated capacitors respectively whereby the state of charge of said capacitors is altered if said further transistor is non-conducting.

7. An encoding device as claimed in claim 5 in which the operation of said comparator is controlled by strobe pulses in synchronism with said timing pulses.

8. An encoding device as claimed in claim 5 in which the circuit for altering the state of charge of each of said capacitors includes a resistor whereby a sudden change of potential is produced followed by a steady change as long as the conditions for producing alteration persist.

References Cited by the Examiner

UNITED STATES PATENTS

| | | | |
|---|---|---|---|
| 2,929,055 | 3/1960 | Wahlstrom | 340—347 |
| 3,051,901 | 8/1962 | Yaeger | 340—347 |

MAYNARD R. WILBUR, *Primary Examiner.*

DARYL W. COOK, ROBERT C. BAILEY, MALCOLM A. MORRISON, *Examiners.*

W. J. KOPACZ, *Assistant Examiner.*